(12) United States Patent
Carroll (10) Patent No.: US 6,194,815 B1
(45) Date of Patent: Feb. 27, 2001

(54) PIEZOELECTRIC ROTARY ELECTRICAL ENERGY GENERATOR

(75) Inventor: Charles B. Carroll, Trenton, NJ (US)

(73) Assignee: Ocean Power Technology, Inc., Pennington, NJ (US)

( * ) Notice: Subject to any disclaimer, the term of this patent is extended or adjusted under 35 U.S.C. 154(b) by 0 days.

(21) Appl. No.: 09/253,269

(22) Filed: Feb. 19, 1999

Related U.S. Application Data (63) Continuation-in-part of application No. 08/738,335, filed on Oct. 25, 1996, now abandoned.

(51) Int. Cl.[7] ............................................. H01L 41/04
(52) U.S. Cl. ............................................................ 310/339
(58) Field of Search .................................. 310/339, 332, 310/311

(56) References Cited

U.S. PATENT DOCUMENTS

| | | |
|---|---|---|
| 3,030,527 * | 4/1962 | Czyryk et al. . |
| 3,168,660 * | 2/1965 | Marks ................................. 310/339 |
| 3,430,080 * | 2/1969 | Horan . |
| 4,387,318 * | 6/1983 | Kolm et al. ......................... 310/330 |

FOREIGN PATENT DOCUMENTS

0179584 * 7/1988 (JP) ............................... H01L/41/08

\* cited by examiner

*Primary Examiner*—Nestor Ramirez
*Assistant Examiner*—Peter Medley
(74) *Attorney, Agent, or Firm*—Michael Y. Epstein, RPA (57) ABSTRACT

A piezoelectric generator comprises one or more inner hubs, an outer, stationary support, and a plurality of strap-like piezoelectric power generating elements mounted between the hubs and the outer support. The hubs are mounted for relative rotation on a first shaft mounted eccentrically on a second shaft having an axis of rotation coincident with central axis of the outer support. Rotation of the eccentric first shaft causes the hubs to follow a circular path around the outer support axis but without rotation of the hub around its own axis. The movements of the hubs cause alternate straining and destraining of the piezoelectric elements for generating electrical energy. For obtaining high energy conversion efficiency, the elements are arranged in groups of three or more substantially identical elements which are identically strained but symmetrically out-of-phase with one another.

4 Claims, 10 Drawing Sheets

PIEZOELECTRIC ROTARY ELECTRICAL ENERGY GENERATOR

This is a continuation-in-part of applications Ser. No. 08/738,335, filed Oct. 25, 1996 now abandoned.

BACKGROUND OF THE INVENTION

This invention relates to the generation of electrical energy, and particularly to a piezoelectric electric generator of the rotary type.

Piezoelectric electrical energy generators of the rotary type, e.g., comprising a rotating armature within a stator, are known and described, for example, in U.S. Pat. No. 3,101,420 (Hufferd, et al., Aug. 20, 1963), U.S. Pat. No. 3,208,443 (Hurwitz, Sep. 38, 1965) and U.S. Pat. No. 3,350,583 (Schiavone, Oct. 31, 1967) and in Soviet Union Patent 699,590 (Nov. 25, 1979), the subject matter of which U.S. patents is incorporated herein by reference.

The piezoelectric materials used in these patents are alternately mechanically strained and destrained for generating electrical energy. What occurs is that the mechanical strainings of the materials cause displacements of electrical charges within the materials. The charges resist such displacements, and the energy required to force the charge movement is stored in the form of electrical energy which can be extracted from the materials. In terms of efficiency, practically all the energy required to overcome the resistance by the charges to movement can be stored and recovered. However, the charges are embedded within piezoelectric host materials which themselves resist movement. The energy required to mechanically alternately strain and destrain the piezoelectric materials is generally quite significant, and to the extent that the energy required to mechanically strain and destrain the piezoelectric materials is not recovered, the efficiency of the mechanical energy to electrical energy conversion process is generally very low. The present invention addresses this problem.

SUMMARY OF THE INVENTION

In accordance with a first aspect of the invention, a piezoelectric generator comprises an outer support structure having a central axis, a centrally disposed hub, and means, e.g. a known eccentric mechanism, for causing the hub to circle, without rotation around its own axis, around the central axis of the support structure. A plurality of elastic piezoelectric elements are secured between the hub and respective spaced apart points on the outer support structure. Upon movement of the hub relative to the support structure, the elastic piezoelectric elements are alternately strained and destrained for generating electrical energy.

By using a number n of three or more symmetrically positioned, identical piezoelectric elements, which elements are identically strained, but 360/n degrees out-of-phase with one another, practically all the energy required to initially mechanically strain the piezoelectric elements is recovered for successive strainings of the elements. Accordingly, substantially only that mechanical energy required for direct conversion into electrical energy is required during operation of the generator a for an exceptionally high efficiency of operation.

In accordance with a second aspect of the invention, two hubs are axially spaced apart along a driving shaft with the two hubs being equally eccentrically mounted on the shaft but 90 degrees out-of-phase with one another. Each hub contains one or more groups of piezoelectric elements with each group containing but two elements and with each group of two elements on one hub being matched (as hereinafter described) with a corresponding group of two elements in the other hub for the effective creation of a four element group of elements providing exceptionally high efficiency generator operation.

DESCRIPTION OF THE DRAWINGS

Some of the drawing figures are schematic and the figures are not necessarily to scale.

DESCRIPTION OF PREFERRED EMBODIMENTS OF THE INVENTION

Figure 1:
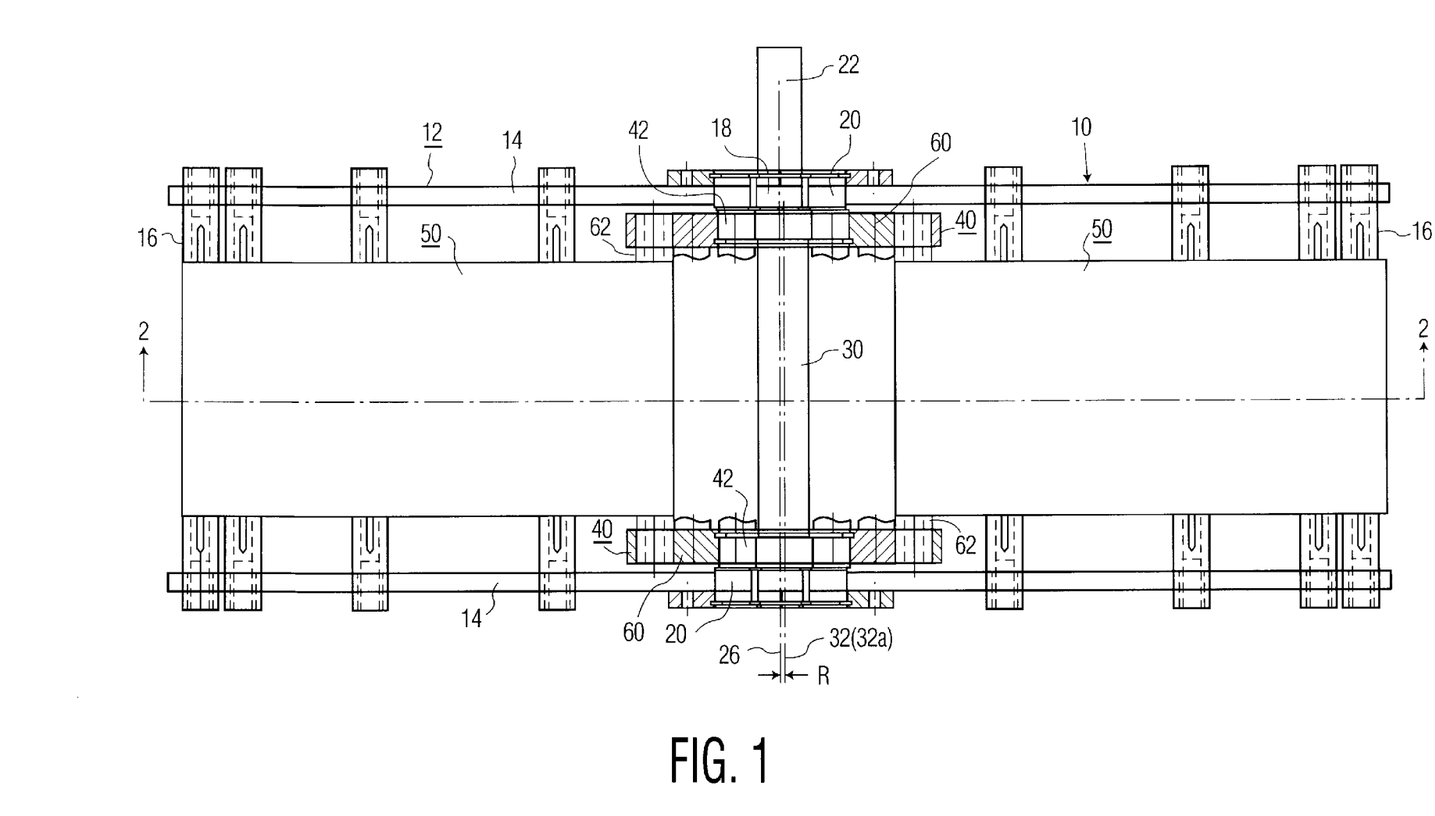
FIG. 1 is a side view, broken away and partly in section, of a piezoelectric generator in accordance with this invention (FIG. 1 also being a sectional view of the generator shown in FIG. 2 along line 1—1 in FIG. 2)
Figure 2:
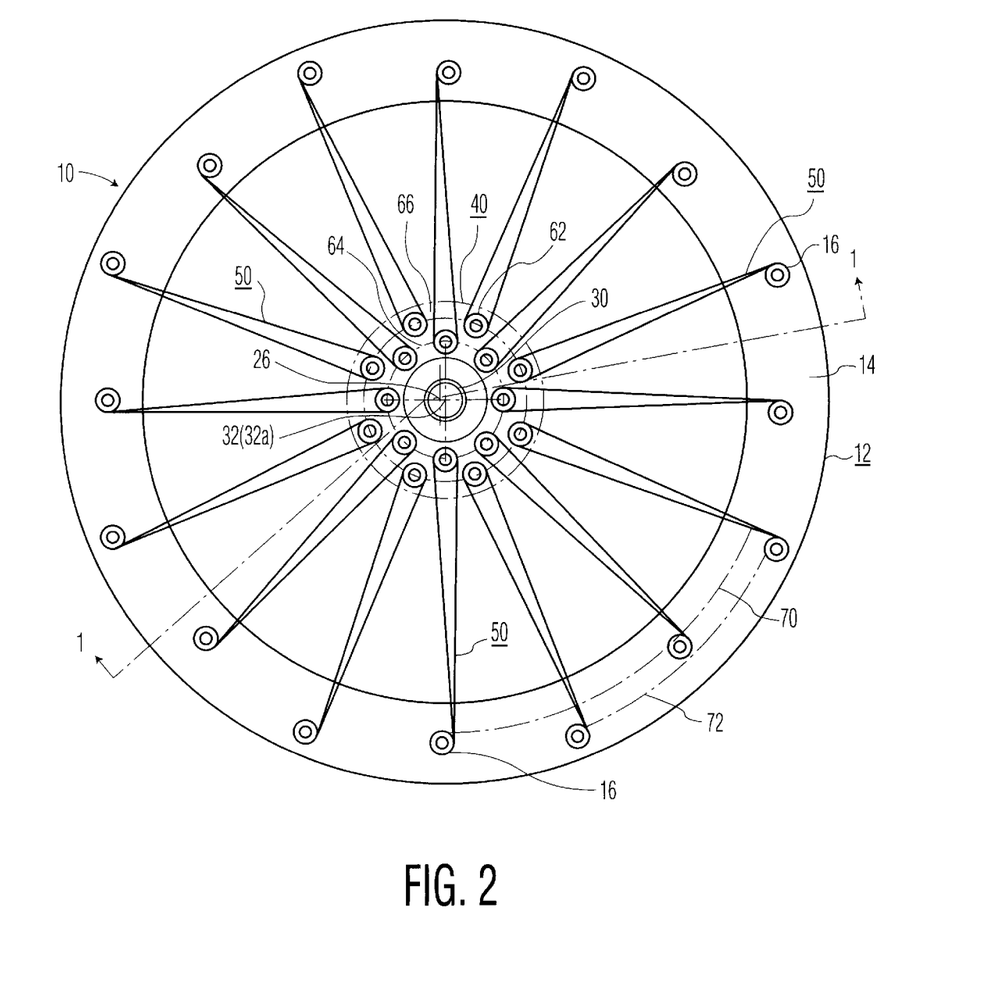
FIG. 2 is a sectional view of the generator shown in FIG. 1 taken along line 2—2 in FIG. 1.

With reference to FIGS. 1 and 2, there is illustrated a generator 10 of quits simple design for illustrating the principles of this invention. The generator 10 comprises an outer structure 12 including two circular plates 14 maintained in spaced apart relation by means of spaced apart posts 16. A rotatable shaft 18 (FIG. 1) extends between the two plates 14 and through bearings 20 mounted centrally of the plates. An end 22 of the shaft 18 extends axially beyond one of the plates 14 for being rotated by a source of mechanical energy, e.g., a flowing fluid for driving a turbine-like structure.

The two bearings 20 define a shaft central axis 26 about which the shaft rotates. The shaft 18, however, includes an eccentric comprising a circular cylinder 30 having a central axis 32 which is parallel to the shaft central axis 26 but offset therefrom by a distance R. Thus, upon rotation of the shaft 18, the central axis 32 of the eccentric cylinder 30 revolves around the shaft axis 26. A circular, cylindrical hub 40 is rotatably mounted, by means of bearings 42, on the eccentric cylinder 30. The hub 40 has a central axis 32a which is coincident with the central axis 32 of the eccentric cylinder 30. The hub 40 is restrained from rotation about its own axis 32a (by means of spoke-like members 50, shortly to be described), but as the eccentric cylinder 30 rotates relative to the hub 40, the eccentric motion of the cylinder relative to the shaft central axis 26 is reproduced by the hub. That is, the hub central axis 32a, similarly as the central axis 32 of the eccentric cylinder 30, revolves around the shaft central axis 26. Such circular movement of the hub 40, without rotation about its own axis 32a, is referred to herein as a circular "orbiting" of the hub 40.

The described circular orbiting of the hub 40 is a known mechanical movement.

As described in greater detail hereinafter, the outer support structure 12 provides a fixed structure to which piezoelectric power generating elements 50 attached to the hub 40 are secured.

Piezoelectric power generating elements are well known, and any of a number of such known elements can be mounted between the hub and the support structure for being alternately strained and destrained in response to relative movements between the movable hub and the stationary support structure.

The term "piezoelectric" has an accepted technical meaning defining a particular class of materials. Herein, however, the term is used in its more generic, non-technical dictionary sense as encompassing any material which, in response to pressure ("piezo"), generates electricity. Thus, materials, technically non-piezoelectric materials, can be used in the inventive devices.

One example of a class of materials having possible utility in "piezoelectric" power generation, as herein defined, is the known "electro-strictive" materials, e.g., polyurethane. Typically, such materials are used as mechanical "actuators", i.e., mechanical movements are produced in response to the application of electrical potentials across the materials. Under proper operating conditions, it is believed that piezoelectric properties can be obtained, i.e., the generation of electrical energy in response to mechanical strainings of the material.

Features of the present invention are the configuration of the "piezoelectric" elements and the manner of mounting the elements on the generator.

As shown in FIGS. 1 and 2, each piezoelectric element 50 comprises an elongated strap-like member formed from one or more layers of electroded piezoelectric material. For reasons to be described, it is preferred that the piezoelectric elements be elastic in the direction of elongation of the strap-like members, and a presently preferred piezoelectric material is one of a number of known PVDF polymers. PVDF stands for poly vinylidene fluoride. By "PVDF polymer" is meant either the PVDF polymer by itself or various copolymers comprising PVDF and other polymers, e.g., a copolymer referred to as P(VDF–TrFE) and comprising PVDF and PTrFE (poly trifluorethylene). As known, piezoelectric properties are imparted to those materials by "poling" them, i.e., heating them in the presence of a large electrostatic field for causing alignment of the electric dipoles in the materials. Upon cooling, the dipoles are "frozen" in their aligned orientation.

Figure 3:
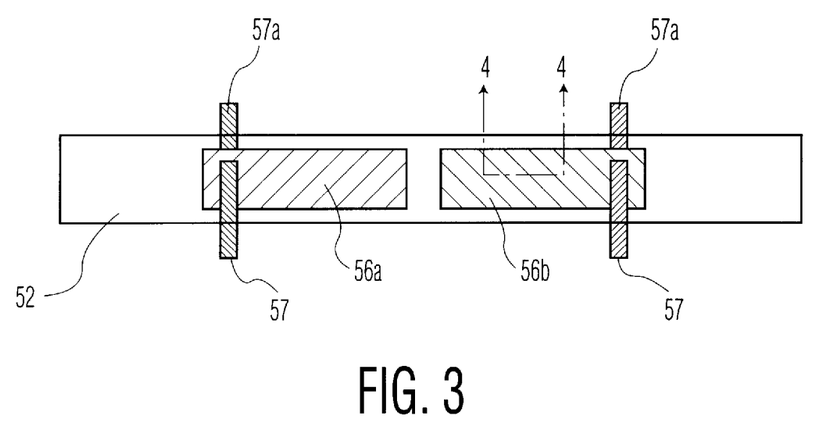
FIG. 3 is a side view of a piezoelectric power generating element for use in the generator shown in FIGS. 1 and 2.
Figure 4:
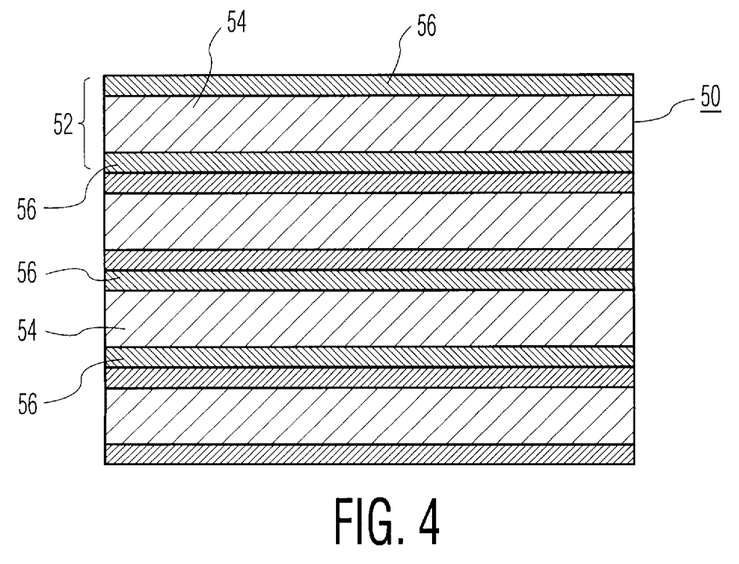
FIG. 4 is a sectional view of the element shown in FIG. 3 taken along line 4—4 of FIG. 3.

Piezoelectric PVDF materials are presently most conveniently formed as thin electroded sheets, and a preferred strap-like element 50, such as shown in FIGS. 3 And 4, comprises a laminate of electroded sheets 52. Each sheet 52 comprises a layer 54 of PVDF of 2–4 mils thickness having 1 mil thick layers 56 of carbon and/or silver electrodes on each major surface of the layer. A number of such electroded sheets 52, e.g., 4–8 sheets, are used together to form the elements 50.

FIG. 3 shows the element 50 prior to its being mounted on the generator 10 shown in FIGS. 1 and 2. FIG. 3 shows only a "front" surface of but one of the sheets 52, but the front and rear surfaces of each sheet of the element 50 are identically electroded and all the sheets 52 of the strap 50 are (except as hereinafter noted) identical. Two spaced apart electrodes 56a and 56b are disposed on each sheet surface with the electrodes on the front and rear surfaces being precisely aligned with one another.

Electrical leads 57, e.g., of thin copper foil, are attached to all the electrodes by means of electrically contactive adhesive. (Spools of electrical "masking" tape, e.g., for electrical shielding functions, comprising copper foil tape having an electrically conductive self-sticking adhesive on the surface thereof are commercially available, e.g., from 3M Corp. and Tracon Corp.) Conveniently, as shown in FIG. 3, all the leads 57 from the "front" surface of the sheets 52 project in one direction (downwardly, as illustrated); and all the rear surface electrodes project in an opposite direction; and all the leads from respective front and back surfaces are in alignment with one another and, preferably, bonded together as by soldering.

Each individual electroded piezoelectric sheet 52 generates a potential difference between the oppositely disposed electrodes 56 of the sheet 52 and, preferably, within the strap 50, adjacent sheets are oriented "front" to "back" so that the pair of electrodes disposed between pairs of adjoining sheets are charged to the same electrical polarity upon the simultaneous straining and destraining of all the sheets of the strap. Thus, all the sheets are connected in parallel, and the output voltage from the strap generating element 50 is the same as the voltage generated by each sheet 52.

For convenience in handling of the strap 50, the various sheets 52 are bonded together by means of a known flexible epoxy adhesive (e.g., "Densil" manufactured by FLEXCON Corp.) disposed between adjacent sheets 52 and contacting only non-electroded portions of the sheets, e.g., the gaps between the electrodes on each sheet surface.

Laminated strap-like elements 50 provide several advantages. One is, as mentioned, the PVDF materials are commercially available as thin sheets. The multiple electrodes provided by the multiple sheets of the laminate are desirable for providing low resistance paths for extracting electrical energy from the elements 50. The amplitude of the voltage generated by each sheet 52 is a function of the thickness of the sheet. Because even quite thin sheets can generate quite large voltages, the sheets are preferably connected in parallel, as described, for avoiding excessively high voltages and attendant arcing problems and the like.

Also, while not discussed herein (as being generally known), it is generally preferable to extract electrical energy from each piezoelectric generating element using resonant electrical circuits using an external inductor matched with the capacitance of the piezoelectric element. Capacitance is inversely related to the thickness of the dielectric layer between the capacitor electrodes, and laminated strap-like elements 50 as herein described have quite large capacitance in comparison with an equivalently thick single layer of PVDF. The larger the capacitance of the piezoelectric element, the smaller need be the inductor used in the energy extracting resonating circuit.

The mounting of the individual strap-like generating elements 52 on the generator is as follows:

The hub 40 (FIG. 1) comprises two axially spaced apart plates 60 (containing the hub mounting bearings 42) secured at the opposite ends of a plurality of posts 62 (FIG. 2) extending between the plates 60 and evenly angularly spaced around the circumference of the hub along two circles 64 and 66 centered on the central axis 32a of the hub. Associated with each hub post 62 is one of the aforementioned posts 16 of the outer support structure 12. In this embodiment, sixteen piezoelectric elements 50 are used connected one each between a hub post 62 and a corresponding support structure post 16. The support structure posts 16 are disposed along two circles 70 and 72 centered on the central axis 26 of the shaft 18, hence are always off-set from the central axis 32a of the hub 40 (which, as previously explained, revolves around the shaft central axis 26).

As shown in FIGS. 1 and 2, each piezoelectric strap-like element 50 is mounted on the generator in the form of a spoke extending from the centrally disposed hub 40 to the surrounding support structure 12. The unstrained radial lengths of all the piezoelectric elements 50 are equal in this embodiment.

Figure 5:
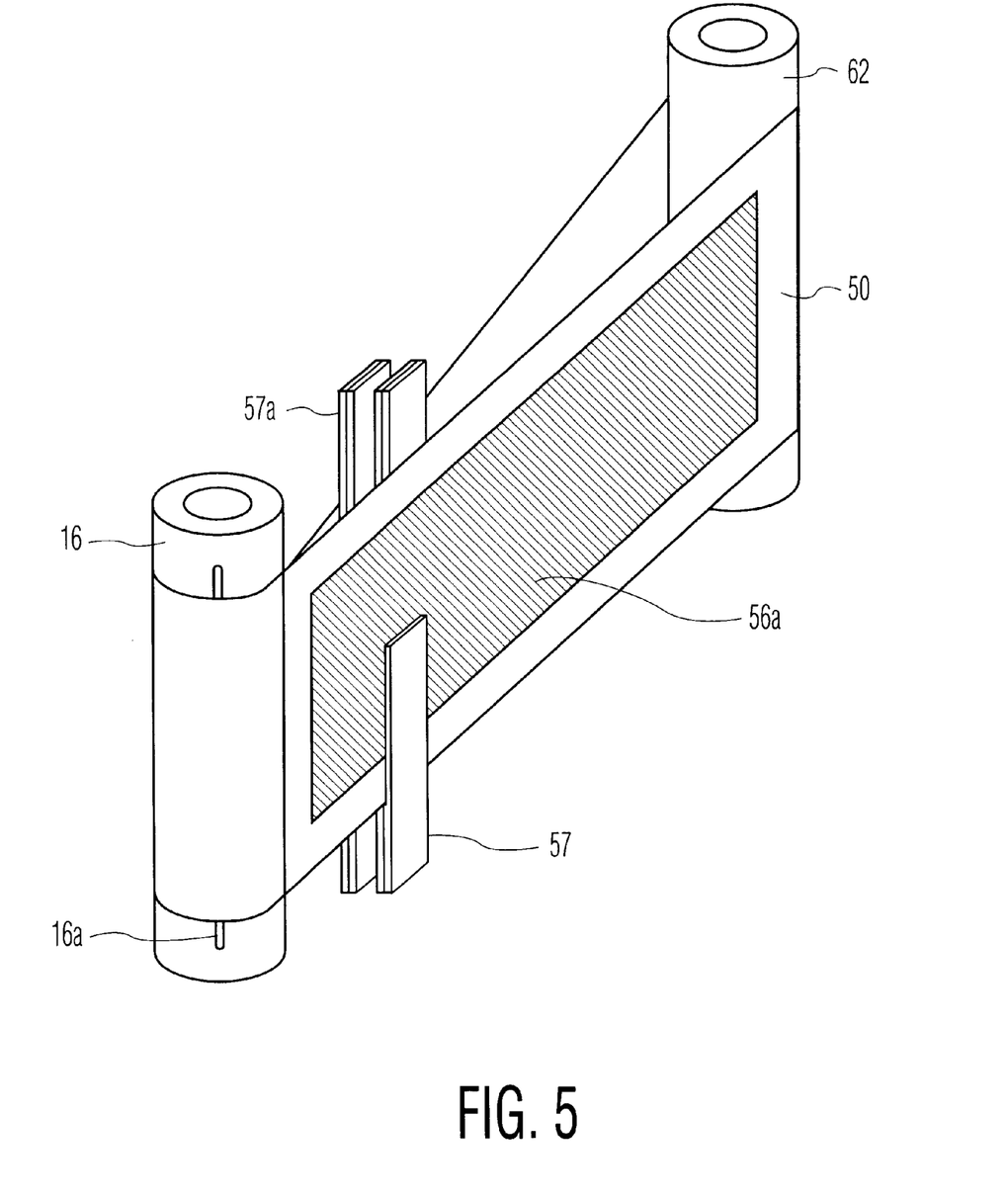
FIG. 5 is a perspective view of one of the piezoelectric power generating elements shown in FIGS. 1 and 2.

As shown more clearly in FIG. 5, the strap-like elements 50 are formed in a loop with the loop bight disposed around a hub post 62 and with the loop ends of each element fixed to a corresponding outer support post 16. In FIG. 5, only the one electrode 56a [of the two electrodes 56a and 56b on the strap "front" surface (FIG. 3)] is visible because the electrode 56b faces oppositely from the visible electrode 56a. A preferred fixing arrangement is to pass both free ends through a longitudinally extending slit 16a in the wall of the tubular posts 16 and then to rotate the posts for both securing the loops in place and providing a preselected degree of tension to each element 50. As shown in FIG. 5, the metal electrode 56a (as well as the electrode 56b) on the piezoelectric sheets 52 (FIG. 3) terminate short of the mounting posts 16 and 62 and experience no curvature owing to the wrapping of the elements 50 around the posts 16 and 62.

As described hereinafter, all the generator elements 50 are always under some amount of tension. Also, during operation of the generator, both the distance and the angular relationship between each hub post 62 and its corresponding support structure post 16 continuously vary with the result that there is a continuous small amount of relative movement between the tensioned strap-like elements 50 and the various posts 62 and 16 about which they are wrapped. However, because the strap members 50 are in full surface, wrapped around relation with the circular posts 62 and 16, the posts 62 and 16 serve to provide uniform and relatively large radius bending and flexure of the straps for avoiding stress concentration points and for minimizing wear during continuous and prolonged operation.

In general, the electrical energy output of a piezoelectric material is a function of its volume, the amount of straining thereof, and the frequency of straining. The useful life of the material is also a function of the amount and frequency of straining and, with strap-like elements 50 of the PVDF type hereinbefore described, a preferred maximum straining of the elements is around 4%, and the preferred frequency of straining is 1–10 Hz. Other piezoelectric elements of different materials and configurations have other optimum operating modes.

The elements 50 generate electrical energy during any change of strain, either increasing or decreasing. To avoid useless movements of the element ends towards one another and sagging of the elements 50, the elements are so mounted between their end support points to be always at least slightly stretched for all movements of the hub relative to the outer cylinder.

For example, if the preferred maximum straining of the elements is 4%, the dimensional relationships of the generator are selected such that the elements are cyclically strained and destrained in the range of 1–4%, with the elements always being strained at least 1. The elements are elastic, and external forces are required to strain them while internal forces cause destraining. The straining and destraining forces are of equal magnitude but in opposite directions.

Any relative repetitive movement of the hub 40 relative to the support structure 12 will cause alternating straining and destraining of the elements 50. A preferred repetitive movement for providing uniform (but generally out-of-phase) strainings of all the elements is the afore-described circling, i.e., "orbiting" of the central axis 32a of the hub 40 around the central axis of the shaft 18. Such motion and the effect thereof are now further described in connection with FIG. 6.

Figure 6:
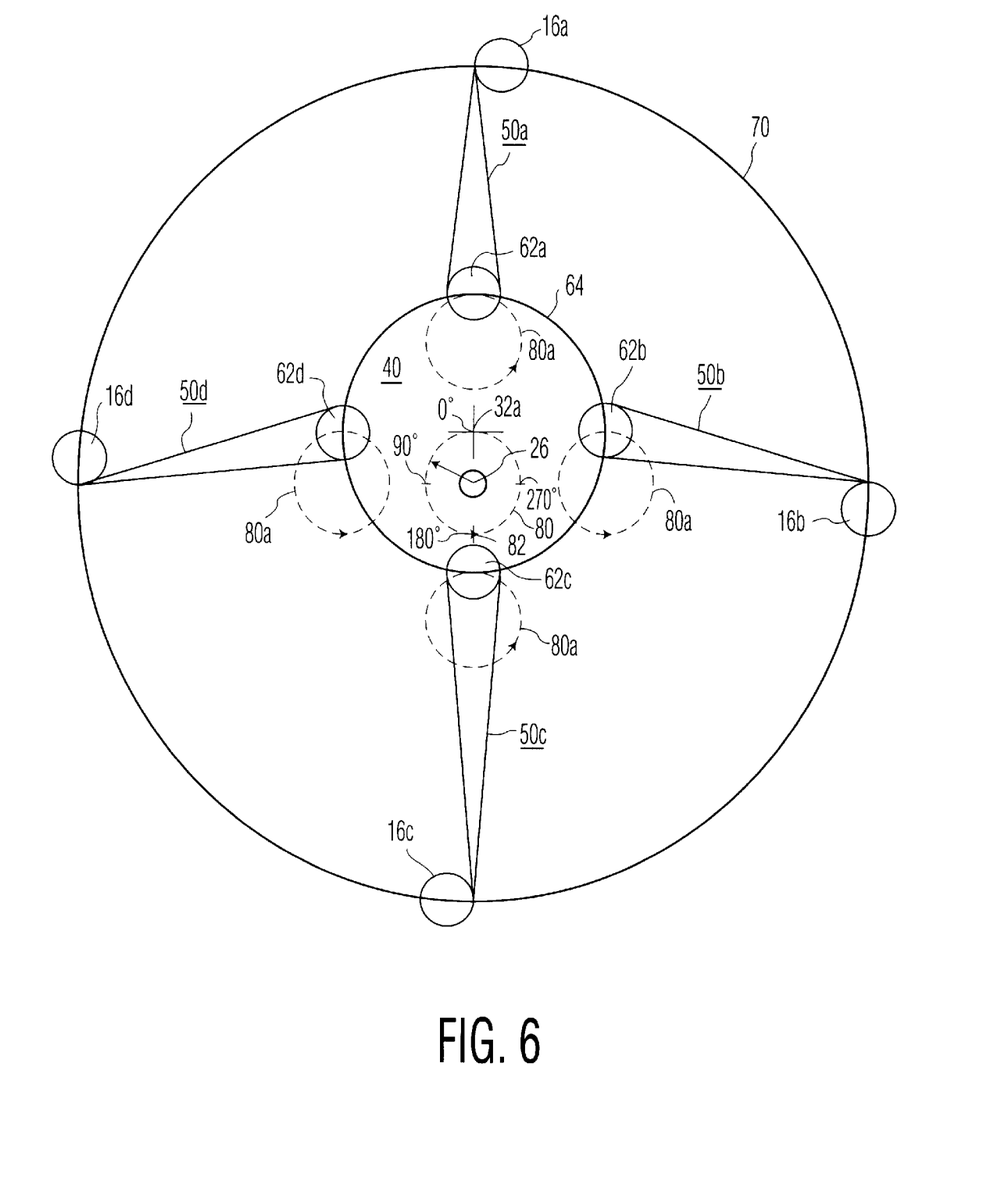
FIG. 6 is a schematic representation of a generator according to the invention for illustrating the relative movements of parts of the generator.

FIG. 6 is a schematic representation of the generator illustrated in FIGS. 1 and 2 but showing, for ease of illustration and explanation, only four piezoelectric elements 50a, 50b, 50c and 50d. In FIG. 5, the outer circle 70 corresponds to the circle 70 (as shown in FIG. 2) around which one set of posts 16 of the support structure are disposed. The circle 70 is centered at the axis 26 of the driving shaft 18. The central axis 32a (indicated in FIG. 6 by a plus sign) of the hub 40 follows a circular path 80 around the shaft central axis 26 and, at the instant illustrated in FIG. 6, the hub central axis 32a is disposed directly above the shaft axis 26. The hub axis 32a is circling counter clockwise in the direction indicated by the arrow 82 and is at the zero degree position (as herein defined) on the circle 80. The outer circumference of the hub 40 is not shown in FIG. 6, but the hub is indicated by a circle 64 around which (as shown in FIG. 2) are disposed four posts 62a, 62b, 62c and 62d about which the respective piezoelectric elements 50a, 50b, 50c and 50d are tightly wrapped.

The hub 40 is quite rigid and, as the central axis 32a of the hub revolves around its circle of radius R in the direction of the arrow 82, all the hub posts 62a–d revolve around respective curves 80a of identical radius R in the same direction. Also, as the posts 62a–d move around their respective circles 80a (in response to rotation of the shaft 18), the distance between each hub post 62a–d and its corresponding stationary post 16a–d continuously varies, thereby continuously straining and destraining the elastic and tensioned piezoelectric elements 50a–d.

Because each hub post 62a–d follows an identical circular path, and because all the posts 62a–d are symmetrically disposed on the hub 40, it is clear that all the elements 50a–d are identically alternately strained and destrained, but not in phase with one another. Thus, at the instant shown in FIG. 6, the top-most post 62a on the hub 40 is positioned at its point of minimum spacing from its corresponding stationary post 16a, and the element 50a is thus experiencing its minimum strain (and minimum stress). Conversely, the hub bottom-most post 62c is at its point of maximum spacing from its corresponding post 16c and the element 50c is experiencing its maximum strain and stress.

The remaining two elements 50b and 50d are experiencing identical strains but with opposite effect. Thus, for the counter clockwise direction of rotation of the hub 40 and hub posts shown, the right-hand post 62b is moving further away from its corresponding post 16b while the left-hand post 62d is moving towards the post 16d. The strain in the right-hand element 50b is thus increasing while the straining of the element 50d is decreasing.

As previously mentioned, the elements are elastic and always under some degree of tension. Increasing the strain of the right-hand element 50b, and on the top element 50a as well, requires a stretching force provided from the moving hub. Conversely, because the strain is being decreased in the left-hand element 50d and in the bottom element 50c, the elasticity of these elements results in forces being applied to the hub for continuing the movement thereof.

The movement of the hub 40 is the aforedescribed circular orbiting. Each hub post 62a–d moves around a circle 80a having a radius R, and it is possible to analyze what is occurring in terms of the torques necessary to cause circling of the posts 62a–d along their paths 80a.

FIGS. 7A through 7D show the torques associated with each element 50, e.g., the right-hand element 50b in FIG. 6, as the hub mounted post 62 revolves around its circle.

Torque is the product of a force acting perpendicular to a moment arm (M), i.e., T=FM. (For example, a force of 10 pounds acting on a moment arm of 0.5 foot produces 5 foot-pounds of torque. One foot-pound of torque acting for one second is equal to 1.36 Watts.) In FIGS. 7A–7D, the moment arm is the radius R of the circle 80a around which the post 62 revolves, and the force is the instantaneous force being applied either by the hub 40 for stretching the element 50 when the hub post 62 is moving away from the support post 16, or the force being applied by the element 50 to the hub owing to the elasticity of the contracting element as the hub post 62 moves towards the stationary post 16. The force is the tension within the piezoelectric element strap 50 wrapped (FIG. 6) around the hub post 62, and two substantially parallel and equal forces act upon each post. For simplicity, only a single force F acting along a single line 50 is shown in FIGS. 7A–7D.

Two variables are present. One variable is the magnitude of the force (F) itself:

$F=YAS$, where

Y=Young's modulus of elasticity;
A=cross-sectional area of the strained material; and
S=strain.

The elements are elastic, and care is taken to strain the elements only in a range where the ratio of stress to strain (Young's modulus of elasticity) is constant. Thus, the force is at a minimum when the post 62 is at the position shown in FIG. 7A and at a maximum when the post 62 is at the position shown in FIG. 7C. Assuming that the length of the piezoelectric element 50 is substantially longer than the radius R, the variable straining of the element, hence, the variable force against the post 62 is a function of the length variation along the X-axis indicated in FIG. 7A. Accordingly, the instantaneous force is:

$F_i=(F_m/2)(1- \cos wt)$, where $F_i$ is instantaneous force; $F_m$ is the maximum force; w is rotational velocity; and t is time.

The other torque variable in the equation T=FM is the length of the moment arm against which is applied a perpendicular force. In FIGS. 7A–7D, the moment arm is the radius R of the circle 80a around which the post 62 revolves, but the effective length of the moment arm is the instantaneous length of a projection of the radius R on an axis perpendicular to the direction of the then acting force F. Assuming, as previously done, that the force F is always acting along the X-axis, the effective length of the moment arm M is thus the instantaneous projection of the radius R on the Y-axis.

Figure 7A:
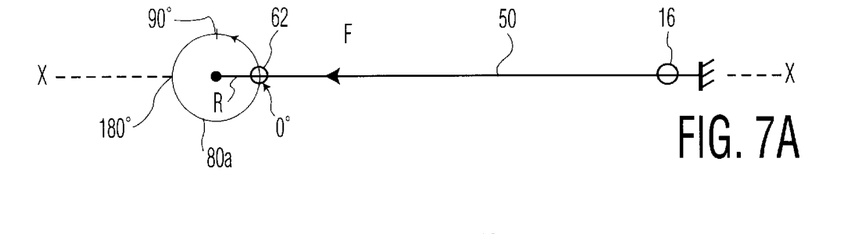
FIGS. 7A–7E are a series of sketches for illustrating the torques associated with relative movements indicated in FIG. 6.
Figure 7B:
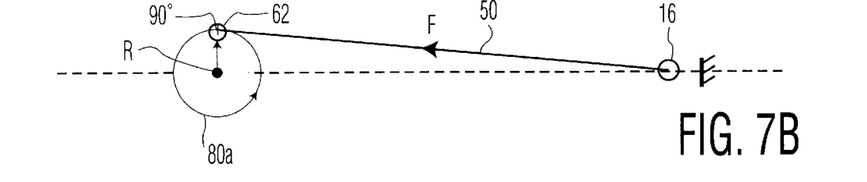
Figure 7C:
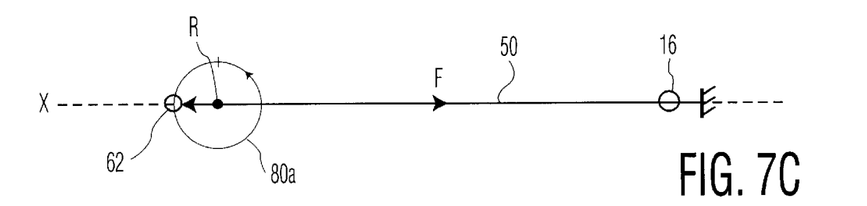

In FIGS. 7A and 7C, for example, the radius R is directly in line with the direction of force (along the X-axis), hence, the length of the moment arm m is zero, and the torque associated with the turning of the hub post 62 at the positions shown in FIGS. 7A and 7C is exactly zero.

As the hub post 62 rotates from the position shown in FIG. 7A towards the FIG. 7B position, the effective length of the moment arm increases (in accordance with the function M=R sin wt) while the amplitude of the force also increases. The torque associated with each turning movement (i.e., the torque required from the hub for stretching the element) rapidly increases.

From the position shown in FIG. 7B to the FIG. 7C position, the force continues to increase as the hub post 62 moves further from the fixed end 16 of the piezoelectric element 50 while the effective length of the moment arm decreases. The torque eventually becomes zero at the FIG. 7C position even though, at the FIG. 7C position, the force is at its maximum value.

As already mentioned, the torque necessary to turn the hub post 62 in a direction for increasing the straining of the piezoelectric element 50, e.g., from the position shown in FIG. 7A to that shown in FIG. 7C, must be provided by the hub. Conversely, the torque required for turning the hub post 62 from the position of FIG. 7C back to that of FIG. 7A is provided by the elasticity of the piezoelectric element. Indeed, as shown in FIG. 7E, if four identical piezoelectric elements 50 were connected to the hub post 62 for being strained 90 degrees out of phase with one another, it can be shown mathematically that the instantaneous sum of the torques associated with the turning hub post is always zero, and the only energy required to keep the hub post in continued rotation is that necessary to overcome frictional losses plus the amount of mechanical energy converted to electrical energy and extracted from the generator.

Figures 7D, 7E:
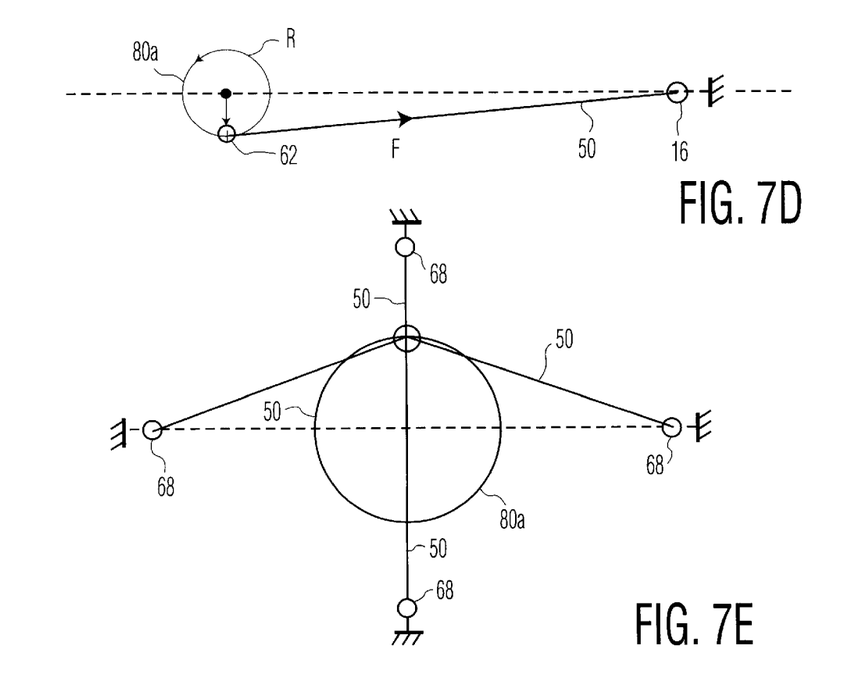

The arrangement shown in FIG. 6 is equivalent to the arrangement shown in FIG. 7E. This is because the of the rigidity of the hub and the fact that all the elements are symmetrically located on the hub (for identical torque interactions with the hub).

Also, comparing FIG. 6 with FIGS. 7A–7D, it is recognized that the torque condition illustrated in FIG. 7B (intermediate force of increasing amplitude) corresponds to the torque condition of the right-hand element 50b of FIG. 6; the torque condition of FIG. 7A (minimum force of increasing amplitude) corresponds to the torque condition of the top element 50a of FIG. 6; FIG. 7C corresponds to the bottom element 50c; and FIG. 7D corresponds to the left-hand element 50d of FIG. 6.

As described, the torque associated with the rotating hub post 62 shown in FIGS. 7A–7D is a function (the product) of a sine and a cosine function. A plot of torque versus angular position associated with each hub post 62a, 62b, 62c and 62d shown in FIG. 6 is provided in FIG. 8 where torque in arbitrary plus and minus units is plotted on the Y axis and angular position of each hub post is plotted along the X axis. Plus (+) torque indicates that the torque is being provided by the hub for stretching the piezoelectric elements, and negative (−) torque indicates that the torque is being provided by the contracting piezoelectric elements.

Figure 8:
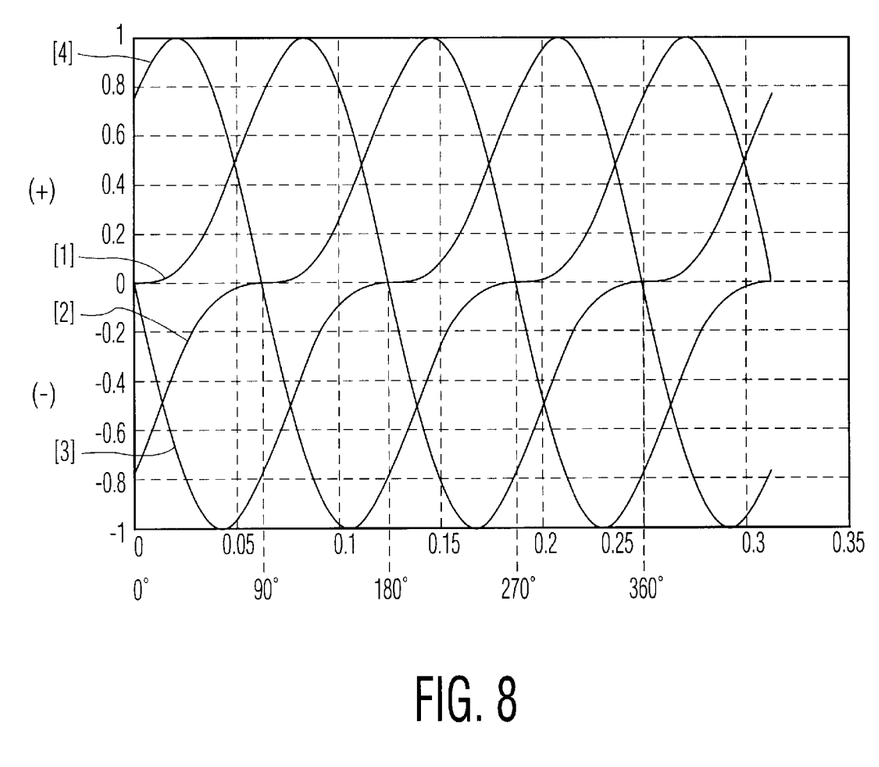
FIG. 8 is a graph showing instantaneous torques associated with respective power generating elements represented in FIG. 6.

The reason that four separate curves 1–4 are shown in FIG. 8 is that, while all of the power generating elements 50a–50d are identically strained over each cycle of operation, at any instant in time, the strainings of the four elements are always 90 degrees out of phase. For example, in FIG. 6, as previously described, the element 50a is at its minimum strain while the element 50c is at its maximum strain. The four curves 1–4 in FIG. 8 are identified with each of the elements 50a–50d as follows.

In FIG. 8, at the zero degree point along the X axis, the curves marked 1 and 3 show zero torque. Curve 1 shows an increasing torque with continued rotation, hence, curve 1 corresponds to the torque condition of the top hub post 62a in FIG. 6 because, at the instant shown in FIG. 6, the force being exerted by the element 50a on the post 62a is directly in line with the turning arm R, hence the torque is zero (corresponding to the condition shown in FIG. 7A), and, because the movement of the post 62a is in a direction to cause stretching of the element 50a, the increasing torque is positive (+).

Curve 3 of FIG. 8 shows a zero torque increasing in the negative (−) direction, hence corresponds to the bottom post 62c in FIG. 6 where the torque is beginning to be applied by the contracting element 50c.

Curve 2 shows, at the zero degree position, a negative torque, hence corresponds to the left-hand post 62d in FIG. 6, and curve 4, of positive torque, at the zero degree position, corresponds to the right-hand post 62b.

As previously explained, the instantaneous sum of all the torques associated with the four elements 50a–50d is always zero, This is shown in FIG. 8 where, for any angular position of the hub 40 on its path 80 (FIG. 6) of rotation (i.e., at any point along the X-axis in FIG. 8) the instantaneous sum of the four torques indicated by the four curves 1–4 is always zero. For example, summing the four torques indicated by the four curves 1, 2, 3 and 4 at the zero degree position of the plots shown in FIG. 8, it is clear that their sum is zero. The torques for curves 1 and 3 are zero, and the torque values (0.76) of curves 2 and 4 are the same but of opposite sign. The same is true of all other angular positions.

Accordingly, in the absence of frictional losses and with no electrical energy being extracted from the generator, once set in orbiting movement, the hub would continue to move around its circle without requiring additional energy. Conversely, when electrical energy is being extracted from the generator, the only energy required (in addition to frictional losses) is that required for the generation and extraction of electrical energy.

As previously noted, any relative movements between the hub 40 and the support structure 12 for alternately straining and destraining piezoelectric generating elements supported between the hub and the support structure will generate electrical energy.

However, when the piezoelectric elements are so arranged, as herein described for zero sum torque operation, extremely high energy conversion efficiencies are obtainable. While, for purposes of illustration, FIG. 6 shows one group of four piezoelectric elements 50 (comprising one of the four, four element groups of elements 50 shown in FIG. 2), in general, such zero sum torque mode of operation of a piezoelectric power generator is obtained when "operative groups" of three or more substantially identical piezoelectric elements are present; where the three or more elements of each group are subjected to identical straining cycles but 360/n degrees out-of-phase with one another (where n equals the number of elements present in each group); where the torque interactions between the three or more elements of each group and the hub 40 are substantially identical (but out-of-phase); and where the elements are strained only through a range of strainings where the modulus of elasticity is constant.

Typically, all the piezoelectric elements on the rotary generator are substantially identical, but different elements and different numbers of elements can be used in a plurality of operative groups provided the three or more elements of each group are substantially identical and positioned for equal torque interactions.

In the embodiment illustrated in FIGS. 1 and 2, sixteen generators 50 are used, i.e., four groups of four generators, where each generator 50 of each group is identical but spaced apart by 90 degrees around the hub 40. At any instant of time, all the sixteen power generating elements 50 on the hub are being strained out-of-phase with one-another. This follows because, at any instant of time, only one point on the hub circumference is at (for example) maximum eccentricity providing minimum straining of the element 50 at that point (e.g., generator 50c shown in FIG. 6), while the extent of straining (in terms of amplitude and direction) of all the other elements varies dependent upon their positions relative to the one point of maximum eccentricity. One effect of this, as above-described, is that the sum of all torques on the hub 40, hence on the driving shaft 80, is always zero.

Another effect of the mutually out-of-phase strainings is that if the electrical output of all the piezoelectric elements were combined in a single power line, all the out-of-phase voltages would completely cancel and the power output of the over-all rotary generator 10 would be zero. This cancellation effect is well known in connection with the use of multiple individually strained piezoelectric power generating elements (see, for example, U.S. Pat. No. 4,404,490 to Burns and Taylor, the subject matter of which is incorporated herein by reference), and various techniques are known for extracting and processing the electrical energy from each piezoelectric element for proper accumulation and utilization of all the electrical energy from all the elements.

One problem associated with the need for processing the electrical output from each piezoelectric element is that with, for example, the sixteen elements 50 shown in FIGS. 1 and 2, sixteen separate electrical processing units would typically be used. This problem, however, is significantly reduced in accordance with a second embodiment of the invention shown schematically in FIGS. 9 through 11. The second embodiment can be identical to the first described embodiment, except as herein noted.

Figure 9:
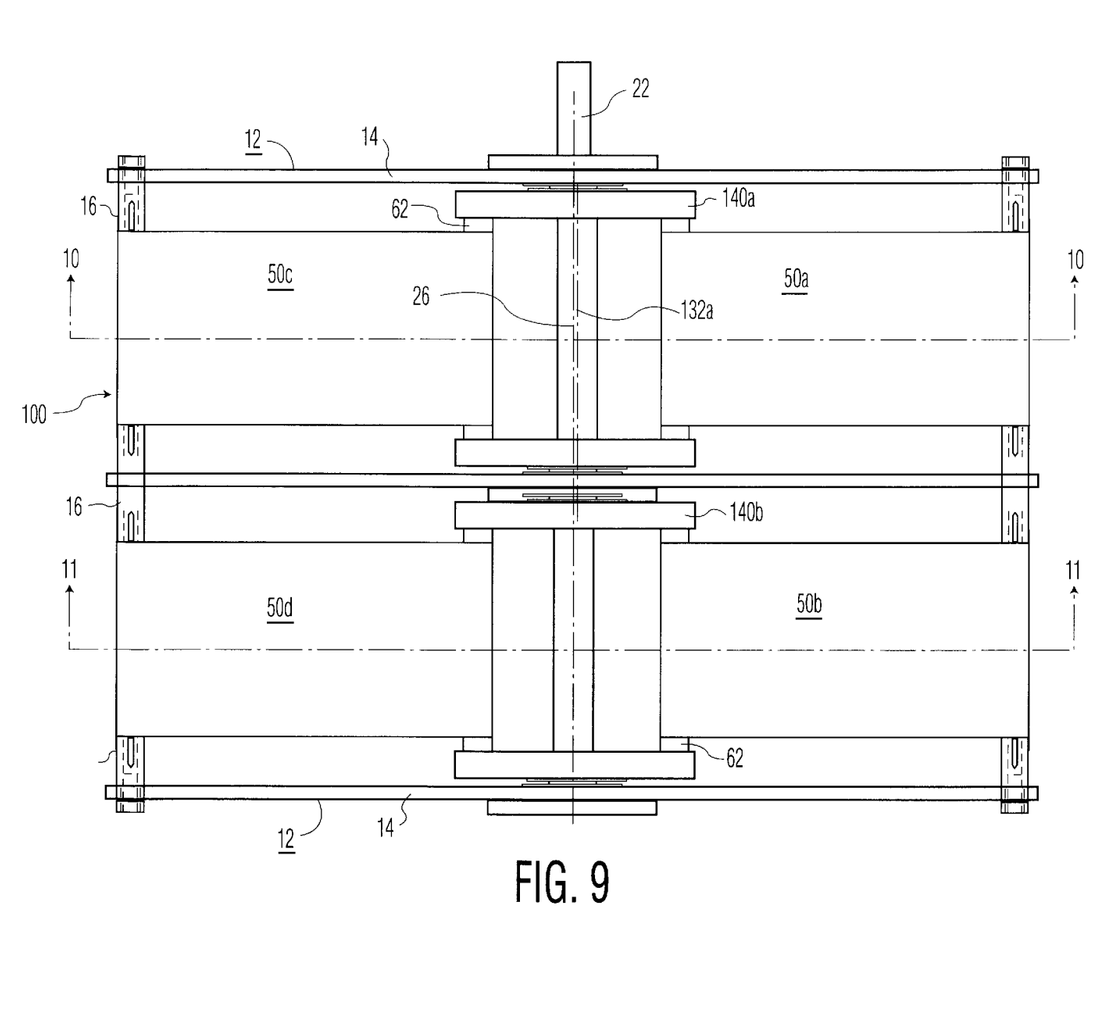
FIG. 9 is a view similar to FIG. 1 but showing another embodiment of the invention.
Figure 10:
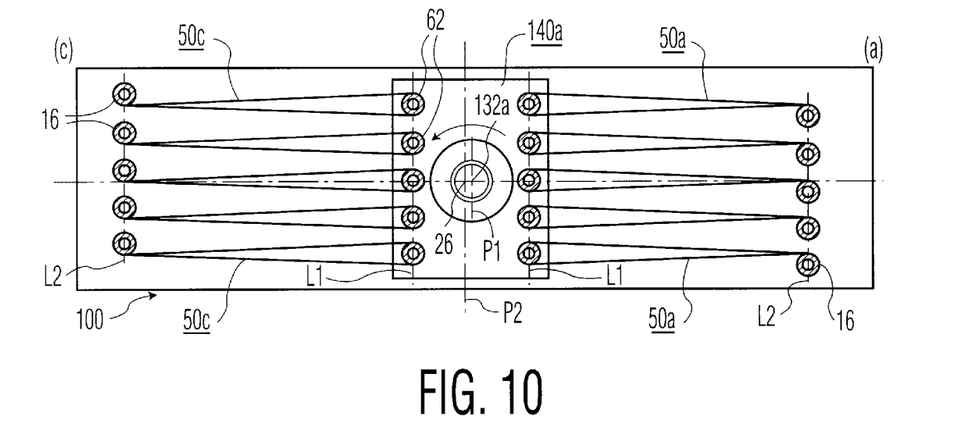
FIGS. 10 and 11 are sectional views taken along lines 10—10 and 11—11, respectively, of FIG. 9.
Figure 11:
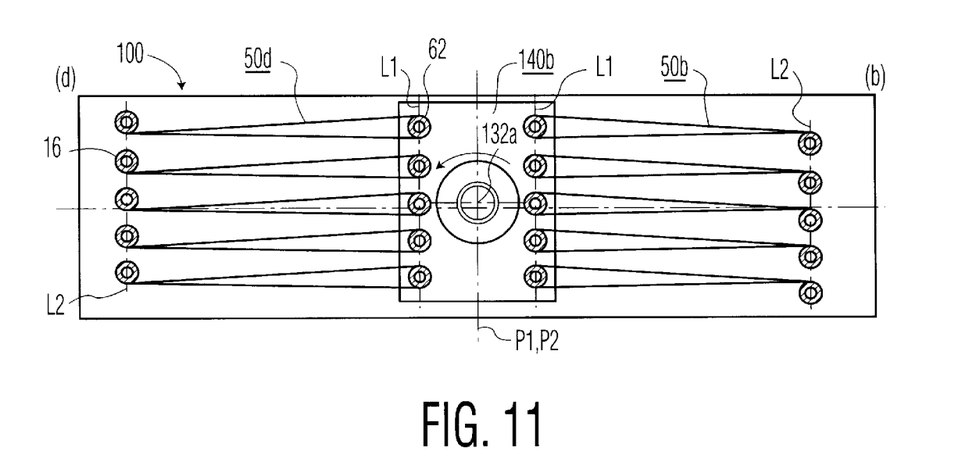

The rotary generator 100 shown in FIGS. 9 through 11 comprises two eccentrically mounted hubs 140a and 140b with the two hubs having the exact same degree of eccentricity but being out-of-phase from one another by 90 degrees. (This is described more fully hereinafter.) Each hub supports a plurality of piezoelectric power generators 50 stretched between posts 62 on the hub and posts 16 on an outer support structure 12. However, in contrast to the hub 40 shown in FIG. 2 (and analyzed in FIG. 6) where the various posts 16 and 62 are disposed around respective circles, the hub posts 62 and the support posts 16 are disposed along respective straight lines L1 and L2.

Each hub 140a and 140b has a central axis 132a which is off-set from and rotates around the central axis 26 of a driving shaft 22 on which both hubs 140a and 140b are mounted. The two straight lines L1 on each hub along which are disposed the hub posts 62 are parallel to one another and equally spaced from a plane P1 parallel to the lines L1 and intersecting the hub central axis 132a. Each pair of straight lines L2 on the outer support structure 12 along which are disposed the support posts 16 are similarly parallel to one another and equally spaced from a plane P2 parallel to the lines L2 and intersecting the shaft central axis 26.

The effect of this arrangement is that each hub 140a and 140b can be considered as comprising but two groups of elements 50, with all the elements within a respective group being identically strained both in amplitude and direction. This is illustrated in FIGS. 10 and 11 where the hub 140a contains two groups of elements 50a and 50c, while the hub 140b contains two groups of elements 50b and 50d. The basis for the letter (a–d) designations is described hereinafter.

As mentioned, the two hubs 140a and 140b are equally eccentrically mounted on the shaft 18 but 90 degrees out-of-phase with one another. In FIG. 10, the hub 140a is shown, at one instant of time, with its central axis 132a positioned directly (horizontally) to the right of the shaft 18 axis 26. Using the coordinate system used in FIG. 6, the hub 140a is thus at its 270 degree position. At the same instant in time illustrated in FIG. 11, the hub 140b (FIG. 11) is disposed at the zero degree position, i.e., 90 degrees out-of-phase with the hub 140a. The degree of eccentricity of each hub 140a and 140b, i.e., the length of the radius R of the circle 80 (FIG. 6) about which each hub orbits, is equal.

Considering the hub 140a shown in FIG. 10, all the elements 50a 50 shown to the right of the hub axis 132a are being identically strained. This follows because, with a rigid hub, every point on the hub follows an identical circular path (such as the circular path 80a shown in FIG. 6) as the hub orbits around the shaft 22 axis 26. With the linear arrays of posts 16 and 62 shown, all the hub posts 62 on the right side of the hub 140a follow identical paths relative to the respective fixed posts 16 to the right of the hub 140a; all the right-hand side elements 50 are being minimally strained; and the straining of these elements is exactly as shown for the element 50a shown in FIG. 6. For this reason, all the elements 50 to the right of the hub 140a are identified by the letter "a", i.e., 50a.

Likewise, all the elements to the left, in FIG. 10, of the hub 140a are being identically maximally strained and correspond to the straining of the element 50c shown in FIG. 6.

On the hub 140b shown in FIG. 11, the right-hand elements are being identically strained similarly as the element 50b in FIG. 6; and the left-hand elements correspond identically with element 50d in FIG. 6.

In connection with the description of the first embodiment (FIGS. 1 and 2), it was explained that one requirement for zero sum torque on the single hub 40 is that there be present one or more groups each containing three or more elements. In the illustrative embodiments, e.g., as shown in FIG. 6, four element groups are shown with the four elements being disposed symmetrically around the hub, i.e., at 90 degree spacings, hence at 90 degree out-of-phase strainings. The requirement that each group of elements contains three or more elements is not met for either hub 140a or 140b shown in FIGS. 9 through 11. Rather, each hub 140a and 140b contains only groups containing but two elements per group. Thus, considering the hub 140a shown in FIG. 10, five two-generator groups of elements are shown, with each group consisting of one element 50a and one element 50c disposed at equal distances from the hub axis 132a. The same is true for the hub 140b where each two-element group (of five groups present) consists of one element 50d and one element 50b disposed at equal distances from the hub axis 132a.

Because neither hub 140a nor 140b contains the necessary group of three or more elements, the sum of torques associated with each hub is not zero. In FIG. 8, for example, while the sum of torques associated with but two elements can be zero at any instant, e.g., the sums of pairs of curves 1–3 and 2–4 at the zero degree position in FIG. 8, at other instants, the sums of each such pairs of curves 1–3 and 2–4 is not zero.

However, considering the two hubs 140a and 140b together, proper four-element groups of elements are present. Each such group consists of two elements 50a and 50c from the hub 140a and two corresponding elements 50d and 50b from the hub 140b.

By "corresponding" is meant that all the four elements 50 of the group of four elements are equally spaced from their respective hub axes 132a, hence act through equal effective length (but varying) moment arms. That is, the torque interactions of the four associated elements are equal, but out-of-phase, to obtain zero sum torque operation.

For example, in FIG. 10, five two-element groups are shown. Each two-element group consists of one element 50c and one element 50a disposed at the same distance from the hub central axis 132a, e.g., the top two elements 50c and 50a. Being symmetrically disposed relative to the hub axis 132a, the two elements 50a and 50c that are disposed along the horizontal axes P3, have similar effective length moment arms, and hence have similar torque interactions with the hub 140. Other pairs of elements 50a and 50c (e.g., the second pair from the top) also have similar torque interactions with the hub 140 but which differ from the torque interactions provided by the pair 50a–50c, disposed along P#. The pair of elements 50a–50c that is fourth from the top also has a similar, but different torque interaction with the hub 140a. However, the combination of the pair of elements 50a–50c that are second from the top with the pair that is fourth from the top produces torque interactions that are identical in effect to the pair along axis P3. This is because they are an equal distance above and below axis P3.

Properly acting four-element groups are obtained by arranging each pair of elements 50d and 50b on the hub 140b in identical positions as a corresponding pair of elements 50c and 50a on the hub 140a. Thus, for example, the top-most pair of elements 50d and 50b are precisely positioned relative to the axis 132a of the hub 140b as are the top-most elements 50c and 50a positioned relative to the axis 132 of the hub 140a.

All the elements 50a–50d, in this embodiment, are identical, hence all the aforementioned conditions for zero sum torque operation are obtained. Thus, groups of four identically, but mutually 90 degree out-of-phase, strained elements 50a–50d are present symmetrically disposed relative to one another for providing identical, but properly out-of-phase torque effects. Thus, when combining the torques associated with both hubs 140a and 140b, zero torque is always present relative to the common driving shaft 22. In terms of energy being provided from the shaft 22 for driving the over-all generator, the zero sum torque condition provides the previously described high efficiency of power generation.

A significant advantage of the generator 100 illustrated in FIGS. 9 through 11 is that, owing to the linear array of support posts 16 and 62, all the elements on any one side of the hubs 140a and 140b are always identically strained. For example, all the elements 50c to the left (in FIG. 10) of the hub 140a are being identically maximally strained, hence, generate identically in-phase a.c. output voltages. Accordingly, all the elements on each side of the two hubs 140a and 140b can be respectively electrically connected in parallel without the need for intervening power processing circuits. In comparison with the generator 10, shown in FIGS. 1 and 2, consisting of sixteen mutually out-of-phase strained elements 50 requiring sixteen individual electrical processing units, the twenty elements 50 shown in the generator 100, being arranged in four groups of identically strained elements, require but four electrical processing units. Such reduction in needed electrical processing units is desirable for reducing the costs and complexity of the generating apparatus, as well as for increasing the energy conversion efficiency owing to reduced electrical power losses in the reduced number of processing units.

One reason the illustrative embodiments show sixteen elements with the circular apparatus 10 shown in FIGS. 1 and 2 and twenty elements 50 with the "linear" apparatus 100 shown in FIGS. 9 through 11, is that the latter arrangement makes better use of space and allows a higher packing density of otherwise identical elements 50. This is generally desirable. Also, setting-up of the generators 10 and 100, with proper pre-tensioning of the various elements 50 is easier in the "linear" generator 100 owing to the need for identical strainings of many of the elements (e.g., in groups of five elements in the generator 100 versus the sixteen different differing strainings required for the respective elements 50 in the generator 10.

Any number of different sources of energy can be used for causing rotation of the central, driving shaft 22 of the generator. One particularly important source of mechanical energy is that contained in surface waves on large bodies of water, particularly the oceans. Various known arrangements can be used for converting wave energy into rotary energy suitable for driving a generator according to the invention, but the presently preferred arrangement is similar to that shown in U.S. Pat. No. 4,277,690 (Noren, Aug. 7, 1981) and U.S. Pat. No. 4,773,221 (Noren, Sep. 27, 1988), the subject matter thereof being incorporated herein by reference. These patents disclose a floating structure for vertical movements in response to passing waves and a piston suspended from the structure which also moves vertically but in a manner different from the movements of the structure for providing relative movements between the piston and the structure. The piston, among other things, is used according to the patents for pumping a hydraulic system for powering a known type of rotary electric generator. The relatively slow rate of oscillation of the wave driven piston well matches preferred operating conditions of the herein described generator.

Thus, the inventive generators can be operated at quite slow speeds while still generating electricity at a high conversion efficiency. This follows because each straining, and destraining, produces a discrete amount of electrical charge which is efficiently removed from the element 50. When the hub (the various hubs 40 or 140a, 14b) are moving very slowly, the mechanical energy required from the shaft 22 is small and the electricity produced is proportionally small because fewer strains and destrains occur, and hence fewer discrete electric charges are produced. When the shaft 22 can be turned rapidly to provide a large amount of mechanical energy, the electricity produced is proportionally large because more electric charges are produced. Accordingly, the disclosed generator produces a high, steady rate of energy conversion both at low speeds and at widely varying speeds.

Also, owing to the possible quite slow speed of movement of the hubs (e.g., in response to passing ocean waves) the interior of the generators, i.e., the volume within the outer support structure 12 and including the piezoelectric elements, can be completely filled with a dielectric fluid, e.g., oil. The fluid provides only small damping of the oscillations of the system owing to the slow rate of hub orbiting while protecting the system against voltage breakdowns as well as from corrosive salt vapors present in ocean environments.

Particularly useful applications for the inventive generators are in combination with flowing fluid driven systems. Such systems readily generate rotary movements directly useable for driving the inventive generators. Additionally, oscillating rotary motions, without conversion to continuous direction rotation, are directly useable by the inventive generators because power generation occurs for either direction of orbiting of the hubs and at a relatively high energy conversion efficiency even with variable speed operation associated with oscillating motions. This is a distinct advantage when compared to conventional generators.

As previously explained, the piezoelectric elements are so dimensioned that, under conditions of minimum stretching (e.g., the top element 50a in FIG. 6), the elements are at least slightly stretched (e.g., around 1% for the presently preferred PVDF piezoelectric elements). Providing some minimum strain in excess of zero is desirable for accommodating small stretchings of the elements during extended use of the generator. Thus, if, over time, the repeated strainings of the PVDF material slightly permanently stretch the strap elements 50, but not in excess of 1% of their total length, the straps retain their elasticity while still remaining under tension over the full range of hub movements. Thus, energy generation is not affected because only the change in strain produces electricity, not the level of strain at which the strain occurs (assuming a constant modulus of elasticity).

As also previously described, the range of strainings of the elements is determined entirely by the dimensions of the generators. Thus, regardless of the range of amplitudes of naturally occurring forces being converted to electrical energy, e.g., ocean waves ranging between small and huge, the range of straining of the elements remains constant and damage of the elements is avoided.

A further embodiment of the invention is now described.

Figure 12:
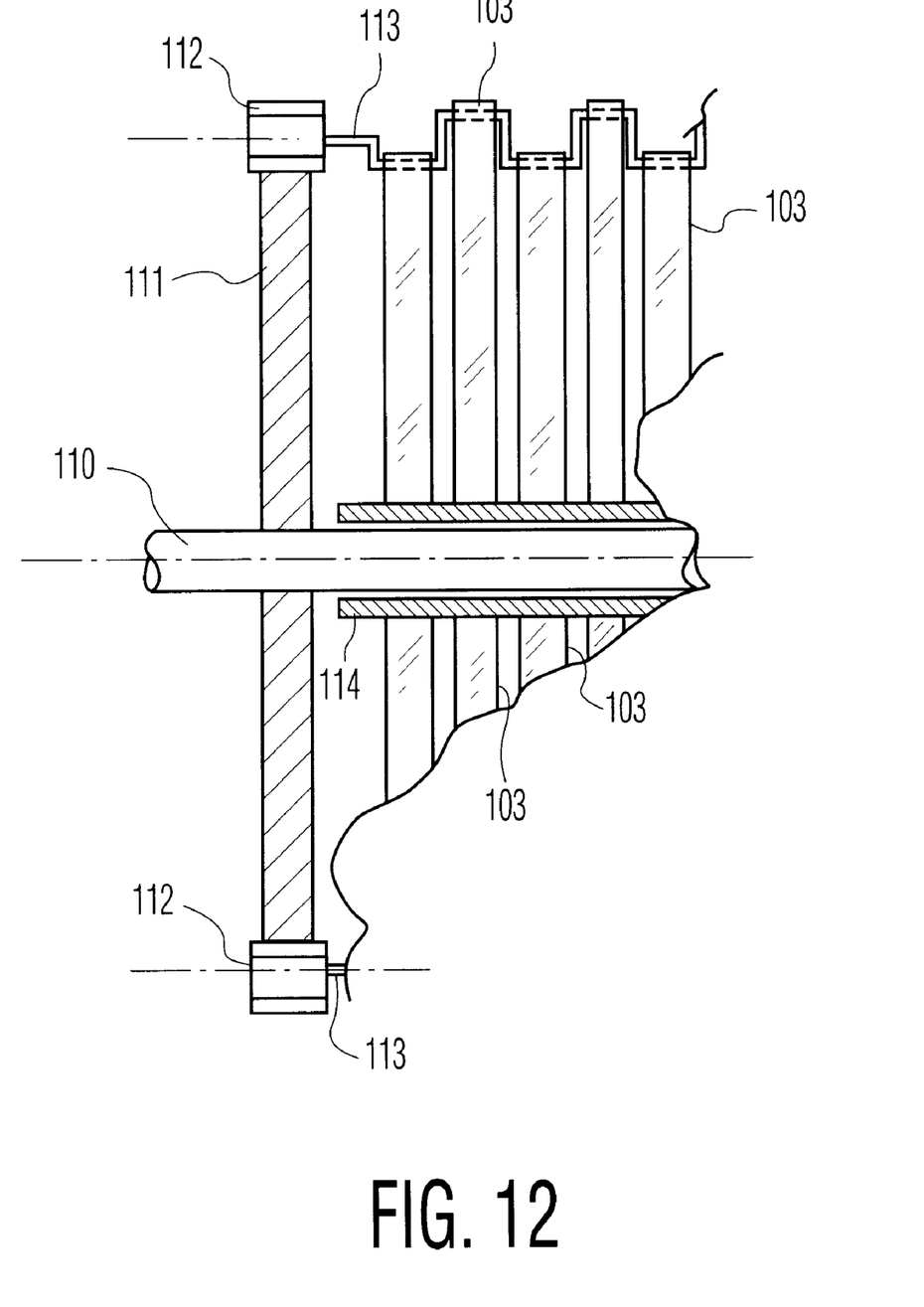
FIG. 12 is a view similar to FIG. 1 but showing a still further embodiment of the invention.

FIG. 12 shows a transmission element 111 (preferably a sprocket wheel) mounted on a journalled shaft body 110 driven by drive elements, not shown. The transmission element 111 drives pinion wheel elements 112, each driving a crankshaft 113. The shaft body 110 also penetrates a shell body 114, which does not rotate with respect to the shaft body 110. Pre-stressed web elements 103 of piezoelectric material extend substantially in radial directions between the shell body 114 and a crankshaft element 113. When the shaft body 110 rotates, the crankshaft elements 113 are rotated such that the web elements 103 are cyclically increasingly stressed and (partly) relaxed. With the transmission using the elements 111 and 112, the rotating speed of the crankshafts is substantially increased, such that the stretching frequency of the web elements is increased. One system comprises one pinion gear element 112 driving one crankshaft element 113 with a number of axially spaced elements 103. Many of such systems can be positioned around the circumference of the transmission element 111. Further alternatives are, e.g., combinations of individual details of previously illustrated embodiments. The web elements 103 can be wire-like and they do not have to be pre-stressed.

What is claimed is:

1. A piezoelectric, electrical energy generator comprising first and second supports, a first piezoelectric power generating element mounted between said two supports for being variably, elastically strained along an axis intersecting said two supports, means for causing one of said supports to circle relative to the other of said supports for causing substantially continuous variable straining of said element in response to continuous relative circling, said first element being one of a plurality of substantially identical elements all of which are secured between respective first and second supports all mounted for causing identical circling movements of each of said first supports relative to respective said second supports for continuously variably straining all of the elements, each of said power generating elements comprising an elongated strip of electroded piezoelectric material secured between said supports, and said elongated strip being folded to form a loop having two free ends and a bight intermediate said two ends, said bight being engaged with said first support, and said two free ends being secured to said second support.

2. A generator according to claim 1, wherein said second support comprises a post, and said two free ends are wrapped, in sandwiched together relationship, around said post.

3. A piezoelectric, electrical energy generator comprising an outer support structure having an axis of elongation, a first elongated hub having an axis of elongation disposed within said outer structure, a plurality of piezoelectric elements secured between first points on said hub and respective second points on said structure, means for causing relative movements between said hub and said support structure for causing circular orbiting of said first points relative to said second points for alternately straining and destraining said piezoelectric elements for generating electrical energy, said hub being mounted for eccentric orbiting of the hub axis around the axis of said support structure for causing said relative movements, said first points on said hub being spaced equally around a circle having said hub axis as a center, said second points on said support structure being spaced equally around a circle having said structure axis as a center, said relative movements causing means causing said hub axis to orbit along a circle around said structure axis without rotation of said hub around its own central axis, said hub being mounted co-axially on a first shaft for rotation relative thereto, said first shaft being mounted for eccentric rotation around a second shaft having an axis of rotation co-axial with said support structure axis components including said hub, said first shaft and said plurality of piezoelectric elements secured between first and second points on said hub and on said structure, respectively, comprising a first generator section disposed along a first length of said second shaft, and including a second generator section substantially identical to said first generator section disposed along a second length of said second shaft spaced from said first length along the axis of elongation of said second shaft and including components identical to said components of said first generator section operably interconnected to one another and to said structure as are said components of said first generator section, the direction of eccentricity of said first shaft with respect to said second shaft of said first generator section being off-set 90 degrees from the eccentricity of said first shaft with respect to said second shaft of said second generator section, said first points on said hub in each generation section being equally divided and spaced along a pair of first parallel straight lines disposed on respective sides of, and equally spaced from a first plane parallel to said straight lines and intersecting said hub axis, and said second points on said support structure being arranged in correspondence with their respective hub first points and along a pair of second parallel lines disposed on respective sides of, and equally spaced from a second plane parallel to said second straight lines and intersecting said structure axis.

4. A piezoelectric electrical energy generator comprising a fixed support structure mounting thereon a rotatable shaft having an elongated axis of rotation, first and second substantially identical power generating sections spaced along said shaft, each said section comprising:

(a) a hub having a central axis mounted on said shaft for eccentric rotation of said hub axis around said shaft axis without rotation of said hub around its own central axis;

(b) first and second linear arrays of first supports disposed along first and second oppositely disposed edges, respectively, of said hub, said arrays being parallel to one another and equally spaced from a plane parallel to said arrays and intersecting said hub axis;

(c) first and second parallel linear arrays of second supports disposed on said support structure and parallel to one another and equally spaced from a plane parallel to said arrays of second supports and intersecting said shaft axis, each of said first supports being associated with a respective second support;

(d) a first plurality of piezoelectric elements mounted between respective first supports of said first array of first supports and associated respective second supports of said first array of second supports, and a second plurality of piezoelectric elements mounted between respective supports of said second array of first supports and associated respective second supports of said second array of said second supports; whereby all of said first plurality of elements are simultaneously and identically variably strained in response to said hub rotation and said second plurality of elements are similarly variably strained but 180 degrees out of phase of the straining of said first plurality of elements, and the central axis of the hub of the first section rotating around the shaft axis synchronously with the rotation of the central axis of the hub of the second section but 90 degrees out-of-phase therewith, whereby said first and second plurality of elements of said first section are variably strained 90 degrees out-of-phase with said first and second pluralities of elements of said second section for causing the sum of torques on said shaft to be zero.

* * * * *